3,454,220
WATER TEMPERATURE REGULATOR SEAL
Erwin J. H. Bentz, Washington, and Francis J. Rother, Morton, Ill., assignors to Caterpillar Tractor Co., Peoria, Ill., a corporation of California
Filed Sept. 11, 1967, Ser. No. 666,687
Int. Cl. F01p 7/02; G05d 23/12
U.S. Cl. 236—34                3 Claims

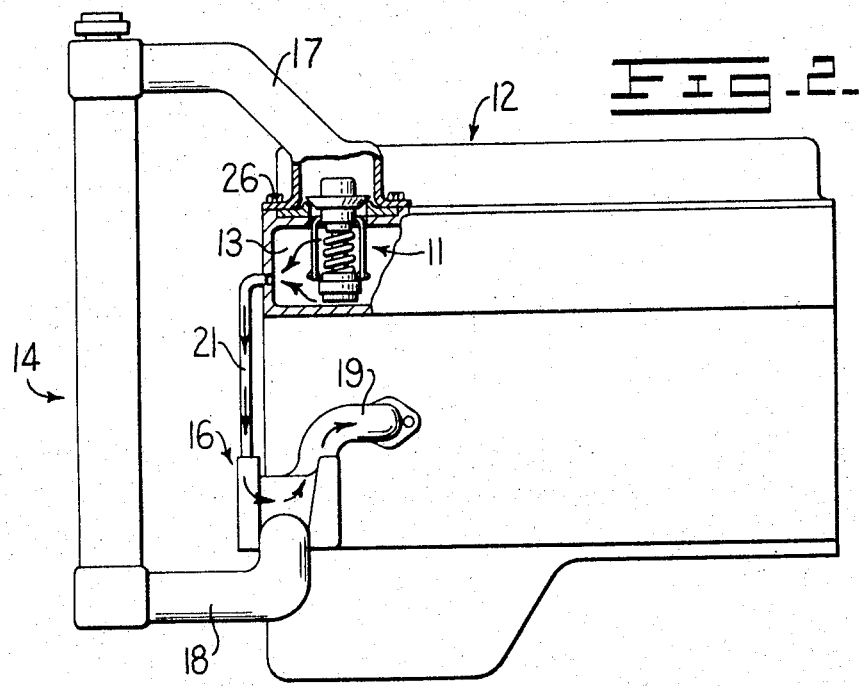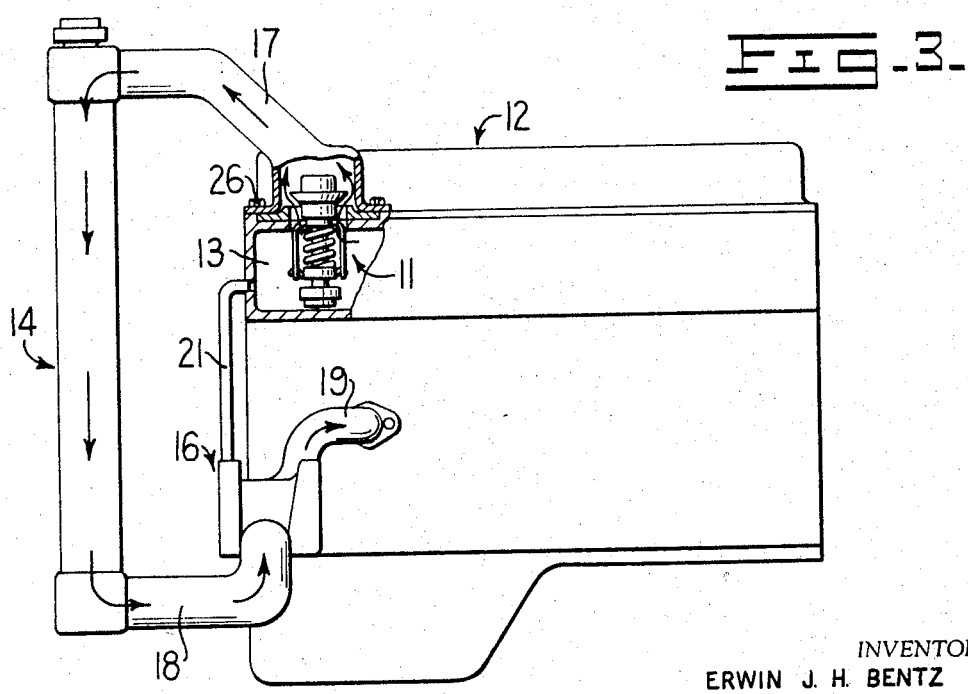

ABSTRACT OF THE DISCLOSURE

A seal for water temperature regulators of a type having a body containing a slideable thrust rod which acts against a valve to control fluid flow. To prevent foreign matter from fouling operation of the rod in the body, a flexible corrugated seal surrounds a portion of the rod and has end portions contacting the valve and regulator body. A spring urges the end portion of the seal into sealing relation with the valve and body. The seal is filled with a suitable fluid to prevent collapse of the seal and to provide clean lubrication between the rod and the regulator body.

---

Figure 1:
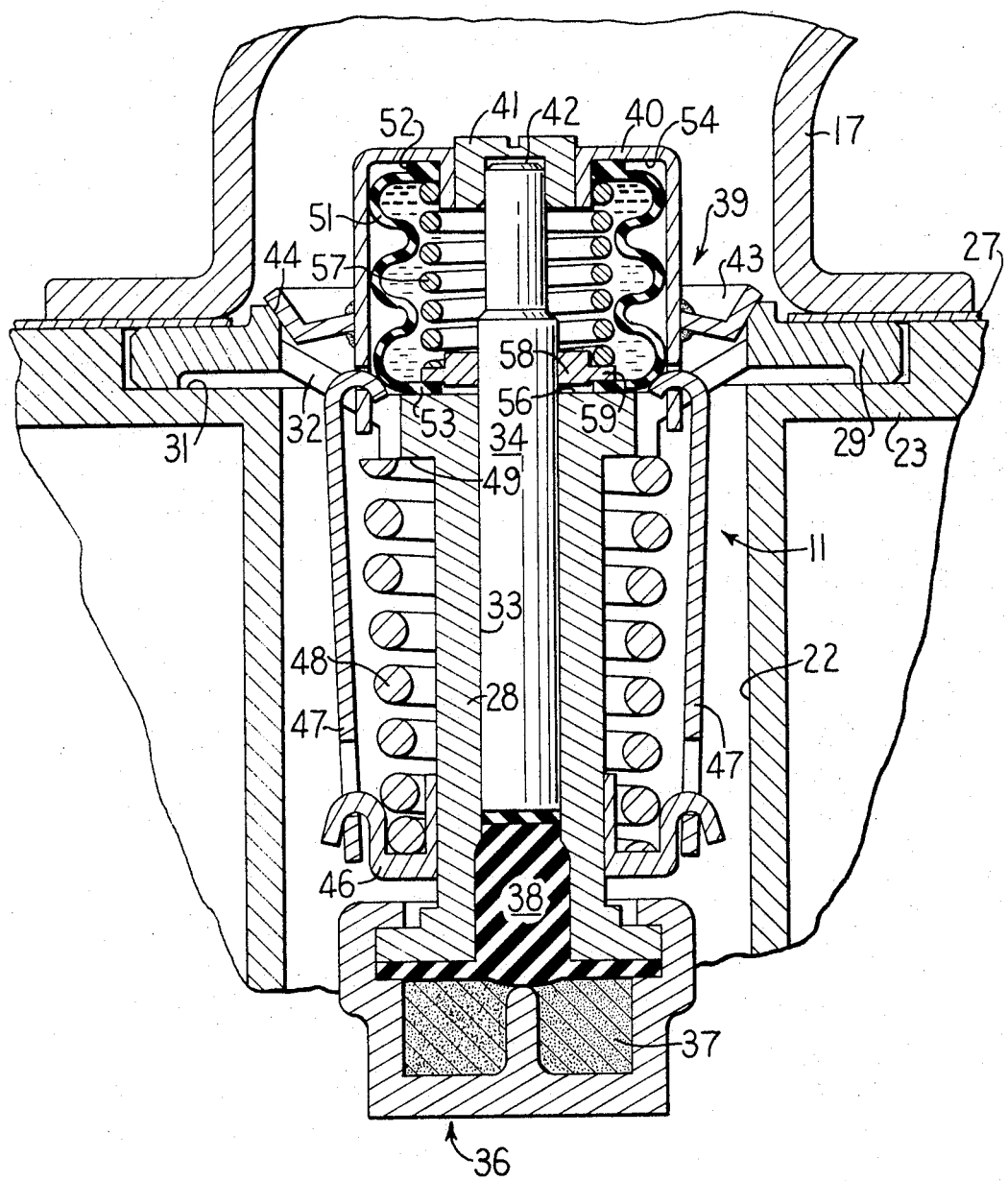

Water temperature regulators are commonly inserted in the coolant flow path of engines to regulate flow to a heat exchanger such as a radiator to maintain the temperature of the fluid coolant at a preselected value. Such regulators commonly have a body containing a slideable rod which is controlled by suitable means sensitive to temperature changes of the surrounding fluids. Since the regulator is surrounded by the coolant, a problem arises in that dirt and other foreign material contained in the coolant may work itself between the thrust rod and the regulator body to eventually cause the rod to stick. Thus, faulty regulation of the coolant temperature and damage to the engine may result.

Although the use of seals has been contemplated to prevent penetration of foreign material between the rod and regulator body, the present invention provides a novel seal which is readily and simply employable with standard water temperature regulators to prevent the problem noted above. The seal member is preferably filled with a suitable fluid which serves not only to prevent collapse of the seal but also provides a clean lubricant to insure proper operation of the thrust rod in the regulator body over long periods of time.

Additional features and advantages of the present invention are made apparent in the description below having reference to the drawings wherein:

FIG. 1 is a fragmentary sectional view of a part of the coolant flow line of an engine showing the regulator of the present invention in place therein; and FIGS. 2 and 3 respectively illustrate the water temperature regulator in closed and open position along with the resulting coolant flow path in the engine.

Referring to FIGS. 2 and 3, a water temperature regulator 11, described in detail below, is illustrated in association with an engine 12, a part of the water jacket of which is shown at 13. A heat exchanger or radiator is shown at 14 and a water pump at 16. A suitable pipe or hose 17 provides a flow path for coolant from the water jacket of the engine to the radiator according to operation of the temperature regulator. A line 18 directs coolant from the radiator to the water pump. Coolant is returned to the cylinder block portion of the water jacket (not shown) in a conventional manner through a conduit 19. FIG. 2 illustrates the water temperature regulator in a closed position resulting from a low coolant temperature such as would be typical during initial start up of the engine with limited coolant circulation through a line 21 and with no coolant flow through the radiator. FIG. 3 illustrates the water temperature regulator in an open position in response to a high coolant temperature whereupon coolant is permitted to be circulated at a greater rate through the radiator to reduce its temperature to the preselected level.

Referring now to FIG. 1, the water temperature regulator is preferably located in an opening 22 of a cylinder head 23, the opening being in fluid communication with the water jacket of the engine of FIGS. 2 and 3. An enlarged end of the outlet line 17 to the radiator is secured to the cylinder head in a conventional manner with bolts 26 (see FIG. 2).

Referring to FIG. 1, the regulator has a body 28 disposed in the cylinder head opening with an integral flange 29 that rests in a counter bore 31 and is in fluid sealing relation with a gasket 27. The flange 29 is joined to the regulator body by means of a spider-like member 32 to permit fluid flow therethrough. The regulator body has a central bore 33 with a slideable thrust rod 34 disposed therein while a conventional power element 36 is disposed at the lower end of the regulator body. The power element is filled with wax or a wax-like compound 37 while a resilient plug 38 is disposed in the lower end of the regulator body bore 33 between the thrust rod and the wax in the power element. When the wax is subjected to heat from the surrounding coolant in the cylinder head opening, it expands against the plug 38 and causes the plug to be extruded into the regulator body bore, thus moving the thrust rod upwardly through the regulator body. Conversely, when heat is removed from the wax, it contracts and the thrust rod is again lowered in the regulator body by spring actions as will be discussed below.

A valve portion 39 of the regulator is disposed at the upper end thereof and comprises an inverted cup-like assembly 40 which fits over the regulator body and has an adjustable guide and stop member 41 to receive the thrust rod in its central bore 42. The member 41 is affixed to the cup 40, for example, by brazing. An annular valve plate 43 is attached to the outer periphery of the cup for sealing engagement with the valve seat 44 formed by the flange 29 of the regulator body. The cup assembly 40 is attached to a sliding retainer 46 around the base of the regulator body by means of straps 47 and is urged downwardly by a spring 48 interacting between the sliding retainer and a spring seat 49 formed by the regulator body.

In typical operation, when the power element wax is at a low temperature due to the engine coolant being below its desired operating level, such as during engine start up, the spring 48 urges the valve cup 40 and thrust rod 34 downwardly, such that the valve plate 43 is in closed relation with the valve seat 44 and only limited coolant circulation is permitted as illustrated in FIG. 2. As the coolant temperature rises above its preselected level, the power element wax is heated and expands, driving the thrust rod and valve portion upwardly against the spring 48 to open the valve and permit coolant circulation through the radiator as illustrated in FIG. 3.

As was noted above, the engine coolant commonly contains dirt and other foreign material which may enter the cup assembly 40 of the valve portion and penetrate between the thrust rod 34 and the bore 33 of the regulator body. To provide a simple seal which is readily adaptable to standard water temperature regulators, a flexible corrugated seal 51 is disposed within the assembly 40 around the thrust rod and has annular end portions 52 and 53 for sealing engagement respectively with an upper surface 54 of the assembly and the top surface 56 of the regulator body around that thrust rod. To retain the end portions of the seal in sealing relation with the assembly 40 and the regulator body, a spring 57 is disposed around the thrust rod and inside of the cylindrical seal portion to act against both end portions of the seal. To prevent radial misalignment of the spring, an annular spring seat 58 is disposed about the thrust rod and has a flange 59 which rests on the lower end of the seal and receives the spring.

To prevent collapse of the cylindrical seal portion, a fluid fills the interior region 59 formed by the seal, the cup like member and the regulator body. The fluid filling the seal is preferably selected to have lubricating qualities, for example, a standard hydraulic brake fluid, which additionally serves to lubricate the thrust rod within the regulator body while remaining free from any impurities in the surrounding coolant to thus increase the operating life of the regulator assembly.

We claim:

1. In a fluid temperature regulator of a type having a body defining an axial bore therethrough, a thrust rod disposed for longitudinal motion in the bore, a valve seat secured to the regulator body, a valve member comprising a cup-like element arranged adjacent one end of the bore with its base being generally normal to the bore for engagement by the rod, and heat sensitive means which, upon being heated, causes the thrust rod to act against the valve member and move it away from the valve seat to permit fluid flow therebetween, the heat sensitive means being effective to hermetically close one end of the bore, the improvement comprising seal means arranged within the cup-like element and comprising a flexible annular portion disposed about the thrust rod and first and second integral end portions to engage and provide fluid seals respectively with the valve member and the regulator body around the thrust rod, the seal means in association with the valve member and regulator body forming a hermetic chamber in communication with the bore and enclosing a portion of the rod extending therefrom, a spring disposed around the thrust rod and within the seal, said spring interacting between the end portions of the seal to maintain them in fluid sealing relation with the valve portion member and the regulator body, and means associated with said seal means to prevent collapse of its flexible annular portion.

2. The regulator of claim 1 wherein said means to prevent seal collapse is a fluid substantially filling the chamber formed within said seal means.

3. The regulator of claim 2 wherein said fluid is a suitable lubricant to provide for clean lubrication between the thrust rod and the regulator body.

References Cited

UNITED STATES PATENTS 2,265,586  12/1941  Vernet _____ 236—34 X

FOREIGN PATENTS 660,871  6/1938  Germany.
934,028  8/1963  Great Britain.

EDWARD J. MICHAEL, Primary Examiner.

U.S. Cl. X.R.

236—100